United States Patent [19]

Adell

[11] Patent Number: 4,753,040

[45] Date of Patent: Jun. 28, 1988

[54] NON-METALLIC DOOR EDGE GUARD HAVING CLEARANCE FOR ADJACENT DOOR SWING

[76] Inventor: Robert Adell, 200 Adell Blvd., Sunnyvale, Tex. 75182

[21] Appl. No.: 56,592

[22] Filed: Jun. 1, 1987

[51] Int. Cl.⁴ ............................................... E05F 7/00
[52] U.S. Cl. ....................................... 49/462; 52/716
[58] Field of Search ..................... 49/462; 52/716-718

[56] References Cited

U.S. PATENT DOCUMENTS 2226615  12/1940  Killen .................................... 49/462

Primary Examiner—Philip C. Kannan
Attorney, Agent, or Firm—Rhodes & Boller

[57] ABSTRACT

A non-metallic edge guard for the trailing edge of the front door of an automobile in those models where the leading edge of the corresponding rear door, because of the manner in which the rear door is hinged, executes a small component of motion toward the trailing edge of the front door when the rear door is opened. The edge guard's base is thinner than its legs, and the base is thinner toward the inner leg than it is toward the outer leg.

8 Claims, 1 Drawing Sheet

NON-METALLIC DOOR EDGE GUARD HAVING CLEARANCE FOR ADJACENT DOOR SWING

REFERENCE TO A RELATED APPLICATION

This application is related to the Applicant's pending application Ser. No. 004,658, filed Jan. 20, 1987, "Non-Metallic Door Edge Guard", and the disclosure thereof is incorporated herein by reference.

BACKGROUND AND SUMMARY OF THE INVENTION

This mechanical invention relates generally to edge guards, and more particularly it relates to novel non-metallic edge guards, for use such as on the trailing edge of swinging closures.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for an object which may be struck by the trailing edge of the swinging closure. That is not to say that an edge guard can protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and functional characteristics, and the insulated metallic edge guards advantageously combine the benefits of metallic and non-metallic components.

Although Applicant continues to prefer the insulated metallic type of edge guard for automotiove use because of the combination of benefits which it provides, he has discovered novel ways to improve upon non-metallic edge guards which can be useful for certain applications. Certain of these improvements in non-metallic edge guards are the subject of this patent application.

Non-metallic edge guards are not broadly new. Examples exist in prior patents such as U.S. Pat. No. 3,547,516 and U.S. Pat. No. 4,372,083. While these prior non-metallic edge guards claim to possess certain beneficial characteristics, the truth of the matter is that in practice they are difficult to install, especially on contoured edges, and once installed, they may not retain satisfactorily over the life of the automobile. More especially, the improved body fit programs of the automobile manufacturers in recent years render it difficult to fit the non-metallic edge guards onto the doors without interference with the door frame openings when the doors are closed.

The non-metallic edge guard which is the subject of the present invention is intended for use on the trailing edges of the front doors of certain models of four door automobiles. In those models, the leading edge of each rear door is separated from the trailing edge of the corresponding front door by a small gap. When a rear door is swung open while the corresponding front door remains closed, the leading edge of the rear door executes a component of motion toward the trailing edge of the front door because of the manner in which the rear door is hinged on the automobile's body.

In certain automobile models which have such door designs door edge guards have not been offered as factory-installed equipment because of certain automobile manufacturers body fit improvement programs which sought to make the fit of body panels, such as doors, much closer to each other. Since door edge guards are typically offered as an option, these body fit improvement programs actually prevented door edge guards from being offered as factory installed options. If the purchaser of one of these models wanted to obtain the benefits of having door edge guards, he had to have them installed by the dealer, and he incurred the cost of having to have the doors readjusted to accommodate the door edge guards.

This problem is also described in Applicant's U.S. Pat. No. 4,587,761, and that patent provided a generic solution. The present invention provides solution which enables door edge guards of non-metallic character as described above to be installed without the necessity of door readjustment.

The foregoing features, advantages, and benefits of the invention along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
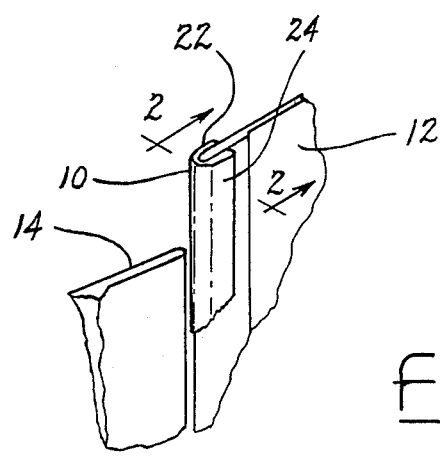
FIG. 1 is a fragmentary perspective view illustrating a door edge guard applied to the trailing edge of a front automobile door.

FIG. 1 shows a non-metallic door edge guard 10 of the present invention installed on the trailing edge of the left front door 12 of an automobile. The edge guard is an elongate strip of non-metallic material and in transverse cross section has a general U-shape. When door 12 is closed, its trailing edge, on which edge guard 10 is installed, is separated from the leading edge of the rear left door 14 by a small gap. The installed edge guard partially fills this gap but does not contact the leading edge of the rear door.

In the models of vehicles described above for which the door edge guard of the invention is particularly adapted, the leading edge of the rear door will move inwardly as the rear door is swung open, and this inward movement will be accompanied by a small component of forward motion. With the present invention, the installed door edge guard is not struck by the leading edge of the rear door as the rear door is swung open. The manner by which this is accomplished will be better understood with reference to FIG. 2 which shows the edge guard's cross sectional shape, as manufactured. When installed on the door edge, the legs are spread more apart than appears in FIG. 2 so they are more parallel with each other.

The general U-shape of edge guard 10 comprises in transverse cross section a generally semi-circular base 20 from opposite ends of which project legs 22, 24. Leg 22 is the outer leg and is disposed against the exterior side of the door trailing edge. Leg 24 is the inner leg and is disposed against the interior side of the door trailing edge. The interior surface of base 20 wraps around the curved end of the door trailing edge. Preferably, substantially the entire interior surface of the edge guard fits against the door edge, and the edge guard is attached by any of the attachment means described in the above referenced application.

In accordance with the present invention to provide clearance for the rear door swing, the edge guard is shaped with a particular shape in the region of where the inside leg merges with the base so that the minimum thickness of the edge guard is along that portion of the base extending from approximately the midpoint of the base, numeral 28, along about 45 degrees of arc to begin merging into the inner leg. The interior surface 30 is radiused along substantially a common radius, preferably 0.070 inch, and the thickness is substantially constant over this region, preferably at 0.005 inch thickness. The center of the radius is at 31. Beyond 45 degrees, the inside surface continues along the 0.070 inch radius extending preferably slightly beyond 90 degrees to merge tangentially into the straight interior surface 32 of the inner leg; however, from the 45 degree point, the exterior surface of the base extends from the exterior surface 36 of the inner leg by a curved radius 38. The inner leg has a substantially constant thickness. preferably 0.060 inch, and the distal end of the inner leg is semicircularly shaped to a radius of half its nominal thickness, i.e. a 0.030 inch radius.

The outer leg has a nominal thickness the same as that of the inner leg, i.e. 0.060 inch, and its distal end is also semicircularly shaped. From the base midpoint 28 to where the base merges into the proximal portion of the outer leg the thickness of the edge guard progressively increases. The interior surface of the base extends from the midpoint of the base along the same 0.070 inch radius to tangentially merge into the straight interior surface 40 of the outer leg. Between the mid-point of the base and where the base merges into the straight exterior surface 42 of the outer leg, the exterior surface of the base extends along an arc 44 such that for any given angular distance about the center 31 as measured from the midpoint of the base, the thickness of the base to the side of tho outer leg is larger than it is at the same angular distance from the midpoint of the base to the side of the inner leg. The drawing FIG. 2 is proportioned in accordance with the foregoing dimensions.

The edge guard can be fabricated according to any of the techniques disclosed in the referenced patent application. Typically where it is fabricated from a colored plastic such as PVC, the edge guard will present its particular color as the exterior appearance. It may be desired to apply an insert, such as a transparent mylar encapsulated foil, to present a different decorative appearance, as in the manner described in the examples from the referenced patent application.

Figure 2:
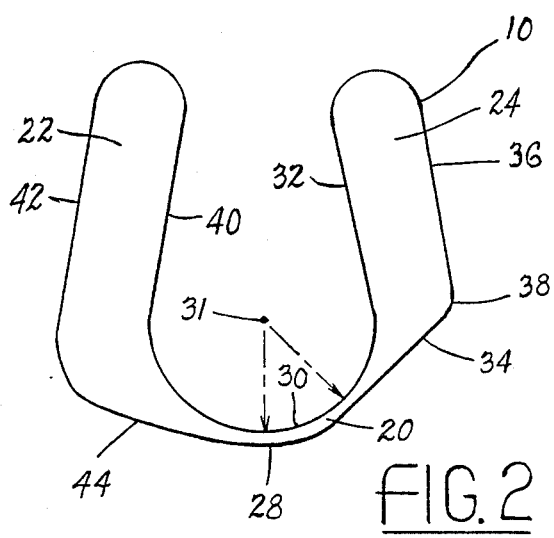
FIG. 2 is a transverse cross sectional view taken in the direction of arrows 2-2 in FIG. 1 on an enlarged scale, but showing the edge guard by itself in the pre-installation shape.
Figure 3:
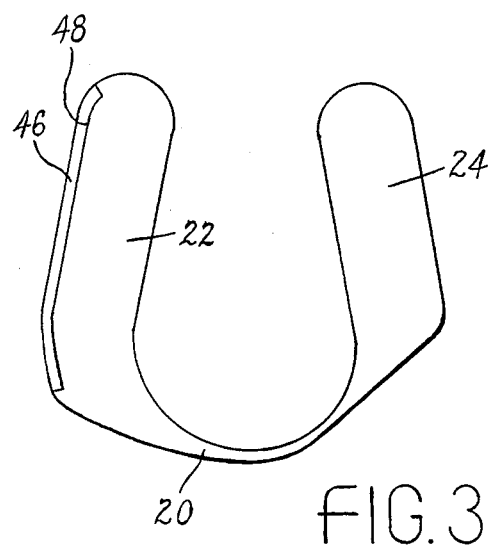
FIG. 3 is a view similar to FIG. 2, but of another embodiment.

FIG. 3 shows such an insert 46 applied to an edge guard which is like that of FIG. 2 except that the exterior surface of the outer leg is notched as shown at 48 to receive the insert. The insert is fabricated and assembled to the edge guard in the manner described in the referenced patent application.

While a preferred embodiment of the invention has been disclosed, it will be appreciated that principles are applicable to other embodiments. Moreover, while the invention is addressed to solve the problem described, the edge guard can be used on doors where the described problem is not present.

What is claimed is:

1. In combination with the trailing edge of a front swinging closure which is separated from the leading edge of a rear swinging closure by a gap, and wherein said leading edge of said rear swinging closure, upon opening from closed position, executes a small component of motion toward the trailing edge of said front swinging closure, the improvement in a decorative and protective edge guard fitted onto the trailing edge of the front swinging closure, comprising a non-metallic body having in transverse cross section a curved base fitting over the end of said trailing edge and inner and outer legs extending from said base over the sides of said trailing edge, said body having said legs of thickness greater than that of said base and the thickness of said base toward said inner leg being less than the thickness of said base toward said outer leg so as to prevent the edge guard from being struck by the leading edge of said rear swinging closure upon opening.

2. The improvement set forth in claim 1 in which the thickness of said base is substantially uniform along an angular extent from the midpoint of said base to approximately 45 degrees toward said inner leg, and beyond said angular extent, the thickness progressively increases to merge into the thickness of said inner leg.

3. The improvement set forth in claim 2 in which the interior surface of said base is curved and the exterior surface of said base is straight over the extent along which the thickness progressively increases to merge into the thickness of said inner leg.

4. The improvement set forth in claim 2 in which the thickness of said base along said angular extent is substantially 0.005 inch and the thicknesses of said legs are substantially 0.060 inch.

5. For use with the trailing edge of a front swinging closure which is separated from the leading edge of a rear swinging closure by a gap, and wherein said leading edge of said rear swinging closure, upon opening from closed position, executes a small component of motion toward the trailing edge of said front swinging closure, an improved decorative and protective edge guard for fitting onto the trailing edge of the front swinging closure, comprising a non-metallic body having in transverse cross section a curved base fitting over the end of said trailing edge and inner and outer legs extending from said base over the sides of said trailing edge, said body having said legs of thickness greater than that of said base and the thickness of said base toward said inner leg being less than the thickness of said base toward said outer leg.

6. An edge guard as set forth in claim 5 in which the thickness of said base is substantially uniform along an angular extent from the midpoint of said base to approximately 45 degrees toward said inner leg, and beyond said angular extent, the thickness progressively increases to merge into the thickness of said inner leg.

7. An edge guard as set forth in claim 6 in which the interior surface of said base is curved and the exterior surface of said base is straight over the extent along which the thickness progressively increases to merge into the thickness of said inner leg.

8. An edge guard as set forth in claim 6 in which the thickness of said base along said angular extent is substantially 0.005 inch and the thickness of said legs are substantially 0.060 inch.

* * * * *